United States Patent [19]
Kurakake et al.

[11] Patent Number: 5,940,292
[45] Date of Patent: *Aug. 17, 1999

[54] NUMERICAL CONTROL DEVICE INCLUDING A THIN TYPE DISPLAY UNIT AND A PRINTED CIRCUIT BOARD CONNECTED TO THE REVERSE SIDE THEREOF

[75] Inventors: Mitsuo Kurakake; Masuo Kokura, both of Hino, Japan

[73] Assignee: Fanuc Ltd, Yamanashi, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/776,906

[22] PCT Filed: Jun. 19, 1996

[86] PCT No.: PCT/JP96/01695

§ 371 Date: Feb. 14, 1997

§ 102(e) Date: Feb. 14, 1997

[87] PCT Pub. No.: WO97/00469

PCT Pub. Date: Jan. 3, 1997

[30] Foreign Application Priority Data

Jun. 19, 1995 [JP] Japan .................................. 7-151247
Jan. 26, 1996 [JP] Japan .................................. 8-31183

[51] Int. Cl.[6] .................................................. G06F 19/00
[52] U.S. Cl. ............................. 364/167.02; 364/474.01
[58] Field of Search ..................... 364/167.01, 474.26, 364/474.28, 474.23, 474.01, 167.02; 345/156, 169, 903, 905; 340/825.06

[56] References Cited

U.S. PATENT DOCUMENTS

| | | | |
|---|---|---|---|
| 3,757,095 | 9/1973 | Kiwiet | 318/569 |
| 4,364,110 | 12/1982 | Hyatt | 364/474 |
| 4,785,221 | 11/1988 | Neko | 318/569 |
| 5,327,350 | 7/1994 | Endo | 364/474.26 |
| 5,565,854 | 10/1996 | Kataoka et al. | 340/825.06 |
| 5,721,835 | 2/1998 | Niwa et al. | 364/708.1 |

FOREIGN PATENT DOCUMENTS

| | | |
|---|---|---|
| 62-38594 | 2/1987 | Japan . |
| 62-296224 | 12/1987 | Japan . |
| 3-58744 | 6/1991 | Japan . |
| 4-47432 | 2/1992 | Japan . |
| 6-318110 | 11/1994 | Japan . |

OTHER PUBLICATIONS

"Wordbook fo New Terms on Information and Communication", '97 Edition, Nikkei BP Corp., Oct. 9, 1996, p. 440, and a copy of page of bibliographic data.

*Primary Examiner*—William Grant
*Assistant Examiner*—Carolyn T. Baumgardner
*Attorney, Agent, or Firm*—Staas & Halsey, LLP

[57] ABSTRACT

A CPU card, a servo card and a display card are replaceably mounted on a CNC controller-printed circuit board which is fixed to the reverse side of a liquid crystal display unit, and execute a CNC control function. Further, a Programmable Machine Control, a spindle interface circuit and a memory means are mounted on the printed circuit board. These elements are connected with a bus. This arrangements provide a small-size and thin-type CNC controller. The CNC controller is connected to each of servo amplifiers for axes through a serial servo including an optical fiber.

21 Claims, 7 Drawing Sheets

NUMERICAL CONTROL DEVICE INCLUDING A THIN TYPE DISPLAY UNIT AND A PRINTED CIRCUIT BOARD CONNECTED TO THE REVERSE SIDE THEREOF

BACKGROUND OF THE INVENTION

1. Field of the Invention

The present invention relates to a numerical control device, and in particular, to a type of numerical control device (hereinafter referred to as a CNC device) incorporating a small-sized computer.

2. Description of the Related Art

A display/operation unit in a machine tool including a CNC device is mounted on a machine operation panel disposed at the front of the machine, for the convenience of an operator's monitoring and operation. But, a CNC controller and a servo amplifier are mounted on a heavy-electrical panel of the machine, since they can not be located on any specific place and also their external dimensions are relatively large. Thus, the CNC controller is connected to the display/operation unit through a cable. A CRT display or a liquid crystal display (hereinafter referred to as LCD) is used as a display for the CNC display/operation unit. A disadvantage of the CRT display is that it occupies a large installation space due to its large depth, whereas the LCD can be made more compact due to its smaller depth.

In the case where a CRT display is used, it does not matter if a CNC controller and a CRT display are connected directly to each other by means of a long cable. By contrast, in the case of a LCD, it is impossible to directly connect a CNC controller and a LCD with a long cable, and a synchronizing circuit with respect to a liquid crystal control signal is indispensable, thereby giving rise to a problem of an increase in cost.

Signals for controlling a CRT display by a CNC controller may be a horizontal synchronizing signal, a vertical synchronizing signal, red, green and blue color signals, etc. The color signals are analog signals, and a brightness of the color signal is determined by a level (voltage level) of each color data. Thus, a slight change of the level during signal transmission would not affect the brightness of color signal that much. Further, if time lag of the color signal happens, as far as it is small, change in color is negligible and the color difference is hardly recognized by the human eye. Therefore, the color signal has a large allowable range with respect to the change in its level and time lag. Thus, in the case where the CNC controller and the CRT display are connected through a cable for transmitting an image control signal such as a color signal, if the length of the cable is within the dimensions of the machine (the length of such a cable is usually about 10 m or so), the change in the level or a time lag of the color signal caused during a transmission process through the cable does not bring about a change in brightness or color as much as human is capable of recognizing with his eyes. Thus, it is possible to directly connect the CNC controller with the CRT display through a cable.

Meanwhile, in the case of the LCD, a standard type LCD is capable of displaying 512 colors to 260 thousand colors. Such color signal, as it is a digital signal, requires signal lines of 3×3 (512 colors) to 6×3 (260 thousand colors), and further signal lines for liquid crystal control for horizontal and vertical synchronizing signals and so on. Since the color signal is a digital signal as described above, if an error occurs at a higher-order bit of the color signal (for example, if the bit is "0" when it has to be "1" or if the bit is "1" when it has to be "0"), brightness undergoes a change by 50%.

Moreover, in the LCD, a dot matrix is used for display, and a display ranging from 640×480 dots to 800×600 dots is currently possible. In order to display on a screen an image having no flicker, there is a need of displaying an image on a screen at a cycle of 60 to 80 times per second. For this reason, a transmission must be made with a clock of about 25 MHz (=(640+α)×(480+α)×60) to 40 MHz (=(800+α)×(600+α)×80)(where, α is a positive integer). Further, as display is done line by line, a sampling clock of 25 MHz to 40 MHz synchronous with a color signal is required in order to accurately fetch color data. In this case, however, there occurs a dispersion in a time lag of a signal due to the characteristics of drive and receiving circuits for transmitting and a cable. Thus, it is very difficult to make a long-distance transmission (about 10 m) without using the clock of 25 MHz or more and without causing any time lag. If there is any difference in the time lag between the clock and the color data signal, color data cannot be sampled. Moreover, if there is a dispersion in the time lag of the color data signal, the color data transmitted as the same dots may be sampled as different data, and thus is displayed as other dots, with the result that a different color will be displayed.

Thus, the connection of the CNC controller and the LCD with a long cable has to be avoided. Therefore, the LCD side has to be provided with a synchronizing circuit for the liquid crystal control signal such as color signal, etc.

In order to reduce the cost of a machine tool including a CNC device, it is important not only to reduce the cost of a machine tool itself but also to reduce the costs of other mechanical and electrical equipment which account for a substantial part of a CNC machine tool cost. Although it is possible to reduce the cost by mass production, but, since machine tools will be used over 20 years to 30 years, the demand for the machine tools are not as large as that for the consumption goods, so that there is a limitation of the cost reduction by mass production. However, CNC devices for machine tools are designed to be applicable to various kinds of machine tools and thus compatible with one another, so that effect of the mass production can be expected to some degree. Thus, the cost reduction of the CNC device greatly contributes to the cost reduction of the machine tool.

In order to achieve the cost reduction, there has been proposed a method of employing a micro computer (hereinafter, referred to as a personal computer) which can be used for various purposes and is available at low cost by mass production so as to constitute a CNC device. However, a CNC device differs from a personal computer in working environment and functions to be required. For this reason, it is difficult for a personal computer to meet the specifications required for machine tools.

A CNC device for use in a factory is exposed to a considerably severe working environment as compared with environment such as that of an office or the like where the personal computer is used. The CNC device is supposed to be capable of meeting requirements of operating conditions such as an allowable temperature range of 0° C. to 45° C., the maximum humidity of 95% and the maximum vibration of 0.5 G, of providing against an instantaneous power interruption conforming to the IEC (International Electrotechnical Commission) standard, and of taking measures for avoiding influences of dust, metallic powder, water, cutting oil, etc. In contrast, in the case of a personal computer, the allowable operating temperature range is 0° C. to 35° C., and the measures against moisture, vibration, instantaneous interruption of power source, and measures for airtightness against dust, metallic powder, water, cutting oil, etc. are not available. Thus, a personal computer is largely different from a CNC device in structural adaptability to operating environment. Therefore, a CNC device requires a structure durable in severe working environment as compared with a personal computer.

For instance, in a CNC device, a floppy disk has a problem of not adapting to an operating environment of a factory in view of temperature, humidity, vibration, etc. Also, a hard disk is not capable of satisfying operational requirements of a CNC device in view of temperature, vibration or the like. For this reason, a hard disk is not basically used either, though it is used only for optional function. Instead of these storage media utilizing magnetism, the CNC device uses storage media such as a flash memory (electrically rewritable nonvolatile semiconductor memory) for storing software, and an SRAM (rewritable nonvolatile semiconductor memory) which stores NC machining programs, various parameters, backed up with a battery, for bearing a working environment requiring operational conditions such as those in a factory.

Moreover, a CNC device is required to have a high-speed data processing ability for controlling a servo motor for individual axis of a machine tool on real-time basis. However, a personal computer, employing a commercially available OS (Operating System), is ill fitted for real time operation, so that its ability can not be sufficiently exhibited. In order to meet the need of high-speed arithmetic operation, the present-day CNC device is provided with a plurality of processors such as a CNC main processor, which performs a function of interpreting an operation command to an NC and giving a movement command of each servo motor to a servo controller and a function of making a communication with an operator who operates machine tool through a keyboard and display, a PMC (Programmable Machine Controller)-dedicated processor, which executes transmission/reception of an ON/OFF signal with the machine tool to perform sequence control for machine tool, a DSP (Digital Signal Processor), which has been developed for signal processing in communication with high-speed data processor for servo control, thereby making available high-speed arithmetic operation for the control of a machine tool. However, since a personal computer is provided with only one processor, it is difficult to employ a personal computer in a control device which is required to perform real-time control of machine tools at a high speed.

Furthermore; a CNC device has to be added various optional functions to provide with a general-purpose ability so that it may be applicable to various machine tools ranging from single-function type to multi-function type and from standard performance type to high performance type. For example, various functions which need to be added to a CNC device are as follows: a loader control function for carrying out handling of workpiece in machining; a RISC (Reduced Instruction Set Computer) function for executing arithmetic operation for realizing high-speed machining with a high accuracy by previously reading a plurality of blocks of NC data in continuous micro blocks such as those of mold machining data to execute acceleration/deceleration control; a communicating function for executing data transmission with external computers through an Ethernet, RS-422, RS-232C, etc.; a customizing function for enabling a software which each machine manufacturer has originally developed for each machine tool independently of the processor of a CNC device. Thus, a CNC device must be constructed so that units and circuits for executing the foregoing functions can be connected therewith.

However, a personal computer is not so constructed as to permit an addition of various kinds of optional functions in machine tools which is required to have a high-speed arithmetic operation ability as described above. At present, in the personal computer, an ISA (Industrial Standard Architecture) bus as a bus for extending optional functions is included in specifications and is now a de facto standard of the manufactures. The ISA bus has a bus width of 16 bits, and the whole address space accessible through the bus is 16 MB, but it is not designed to permit each device connected to the ISA bus to operate as a master of the bus. Therefore, the ISA bus is not so constructed as to permit an addition of various kinds of optional functions for machine tools which is required to have a high-speed arithmetic operation capability.

As described in the foregoing, it is difficult to obtain functions and construction required for the current CNC device with the use of the personal computer. Thus, it is desirable to achieve a cost reduction of machine tools with use of the presently available CNC device. To achieve the cost reduction of machine tools, there is proposed a method of manufacturing a small-sized machine tool. However, in order to manufacture the small-sized machine tool, it is necessary to reduce the size of not only a machine operation panel but also the size of a CNC device itself. In particular, if a machine operation panel for a machine is made smaller in size and thinner in depth, then places which allow the machine operation panel to be installed will increase, thereby contributing to downsizing of the machine tool because of its good operational capability and small space occupied.

SUMMARY OF THE INVENTION

An object of the present invention is to provide a CNC device which is capable of reducing cost by making the CNC device smaller in size by reducing the size of a CNC display/operation unit to be mounted on a machine operation panel and also reducing the depth of a CNC controller.

Further, another object of the present invention is to provide a CNC device which is capable of readily changing the function to be performed.

To achieve the above objects, according to one embodiment of the present invention, there is provided a numerical control device comprising a thin type display unit which uses a digital signal for display input; a sheet of printed circuit board which is attached to the reverse side of said thin type display unit in a state of being opposite to said display unit; one or more card-like circuits which include a processor and integrated circuits for performing numerical control processing; and a card-like circuit for generating a control signal to be transmitted to said display unit, the card-like circuits being connected to the printed circuit board via connectors.

Furthermore, according to another embodiment of the present invention, a CNC controller including the function of a personal computer is formed with single printed circuit board comprising a numerical control circuit which executes numerical control processing, a servo processing circuit which executes servo processing based on the servo motor movement command for individual axis determined through the numerical processing circuit and a circuit which executes personal computer function.

According to the present invention, a CNC controller can be made integral with a display unit and they can be made small-sized and thinner. Furthermore, the display unit and the CNC controller can be connected with a short cable, so that a synchronizing circuit for the display is not needed, thereby contributing to the reduction of the total cost.

DESCRIPTION OF THE PREFERRED EMBODIMENTS

Figure 1:
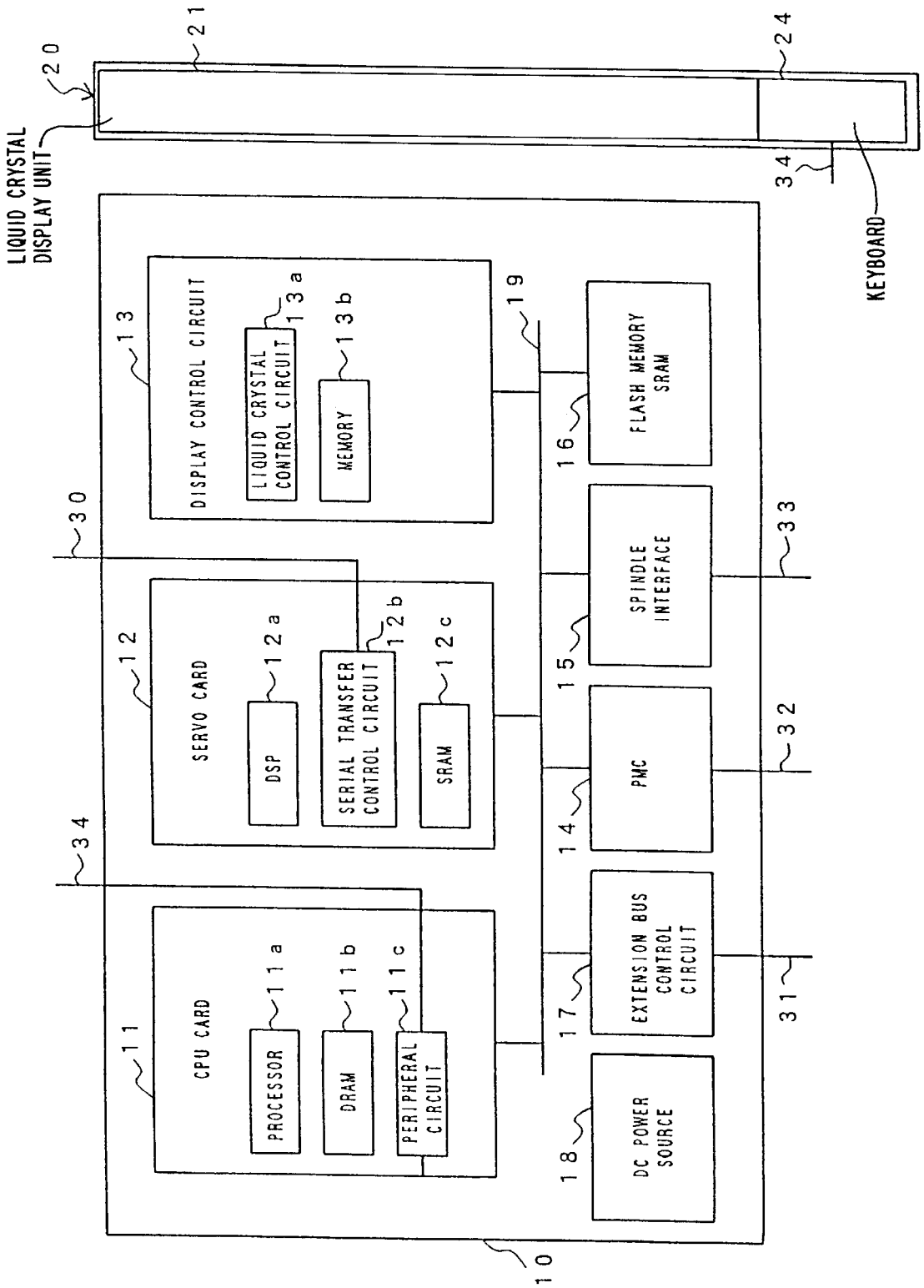
FIG. 1 is a block diagram schematically showing the functions of a numerical control unit and a display unit according to one embodiment of the present invention.

Referring now to FIG. 1, a CNC controller and a display unit of a CNC device according to one embodiment of the present invention will be described below.

In the present invention, a CNC controller of the CNC device includes one printed circuit board 10. On the CNC controller-printed circuit board 10, a CPU card 11, a servo card 12 and a display control card 13, which are modularized by mounting their hardware on a small-sized printed circuit board, are mounted replacebly. Further, the printed circuit board 10 is provided with a PMC (Programmable Machine Controller) circuit 14 which executes sequence control with a machine, a spindle interface circuit 15 which interfaces to a spindle amplifier, a memory circuit 16 comprising a flash memory (electrically rewritable nonvolatile semiconductor memory) which stores CNC software and an SRAM (rewritable nonvolatile semiconductor memory) which is backed up with a battery for storing NC machining programs or various parameters, and an extension bus control circuit 17 controlling an extension control bus 31. These CPU card 11, servo card 12, display control card 13, PMC circuit 14, spindle interface circuit 15, memory circuit 16 and bus control circuit 17 are connected to one another by a bus 19. Furthermore, the printed circuit board is provided with a power source 18 supplying a DC power to the foregoing respective elements.

In the present invention, each element of the CNC controller is made smaller by taking advantage of a high-integration LSI and high-density surface mounting components, thereby constituting the CNC controller with one printed circuit board 10. The CNC controller-printed circuit board 10 is designed to have the surface area substantially equal to the right side of a liquid crystal display unit. This CNC controller-printed circuit board 10 is mounted on the reverse side of a liquid crystal display unit, so that a cable connecting the CNC controller and the liquid crystal display unit can be shortened to about 20 to 30 cm, thereby using a synchronizing circuit for a liquid crystal is not required and realizing a small-sized and thin type CNC controller including a display unit.

A circuit for executing numerical control processing is mounted on the CPU card 11. The CPU card 11 includes a processor 11a executing a function of interpreting an operation command given from machining programs or the like and calculating a movement command to a servo motor of individual axis, a function of interpreting the operation command and transmitting/receiving of an ON/OFF signal with the machine, and a function of communicating with a machine operator through a keyboard and a liquid crystal display unit. The CPU card 11 further includes a DRAM 11b storing CNC control programs and other peripheral circuits 11c. The peripheral circuits 11c include an MDI interface connected to a keyboard 24 of a machine operation panel 20 by a cable 34, an interface executing an input of NC programs from external storage medium such as floppy disk and an interface for a manual pulse generator, etc. The CPU card 11 is replaceably installed on the CNC controller-printed circuit board 10 by a connector (not shown) in FIG. 1. Thus, the CPU card 11 is replaceable with a CPU card having a higher function in order to provide a higher function to the CNC device, or to form a version-up CPU of the same functional level.

The servo card 12 includes a digital signal processor (DSP) 12a, a serial transfer control circuit 12b for controlling a serial servo bus 30 which will be described later, and an SRAM 12c, etc. The digital signal processor 12a executes position and speed feedback controls and current control for a servo motor of individual axis on the basis of a movement command of individual axis given from the CPU card 11 and on the basis of the feedback signals of position, feed rate and current fed back through a cable 30 from a position/speed detector (hereinafter referred to as pulse coder) built in each servo motor, and generates a command to each servo amplifier. Also, the servo card 12 is replaceably installed on the CNC controller-printed circuit board 10, so that the change in the number of servo motors can be coped with by replacing the servo card 12 with another appropriate servo card.

A liquid crystal control circuit 13a, including a processor and a memory, is mounted on the display control card 13. Further, the display control card 13 is connected to a liquid crystal display unit 21 of the machine operation panel 20 by a cable through a connector disposed in the printed circuit board 10. The liquid crystal display unit 21 displays machining programs, machining profiles, tool shapes, tool paths, etc. Further, the liquid crystal display unit 21 is used for preparation and edition of machining programs. An interface between the display control card 13 and the liquid crystal display unit 21 is of TTL level capable of operating with various signals such as dot clock, horizontal and vertical synchronizing signals, red, green and blue color signals, backlight on-off signal, and includes a power supply line. Either a TFT (Thin Film Transistor) liquid crystal display unit or an STN (Super Twisted Nematic) liquid crystal display unit can be used for the liquid crystal display unit 21. Also, both the color and monochromatic display are both possible in the above liquid crystal display units. Moreover, the display control card 13 is replaceably connected to the CNC control printed circuit board 10. As will be described later, a commercially available computer board may be mounted on the printed circuit board in place of the display control card 13 so that a personal computer can be incorporated therein. In this case, the liquid crystal display unit 21 may be omitted.

The PMC 14 includes a flash memory used for storing sequence programs, and is connected with a cable 32 for transmitting and receiving signals between various sensors and actuators of machine. The extension bus control circuit 17 is connected with an optional extension bus 31. The optional extension bus 31 is an exclusive multitask bus connectable with various options such as that for high-speed arithmetic operation. The extension bus 31 has a bus width of 32 bits, and the whole address space capable of being accessed through the bus is 256 MB. Further, the extension bus 31 is a multitask bus capable of permitting the processor of each device connected to the extension bus to function as a master, whereby high-speed performance and extension ability can be improved.

As described above, in the present invention, the CNC controller (CNC controller-printed circuit board 10) is mounted on the reverse side of the liquid crystal display unit, so that the CNC controller is disposed on the machine operation panel on which a display/operational unit is arranged. As a result, a cable 30 for connecting the servo amplifier of individual axis disposed on the heavy-electrical panel of the machine with servo control portion (servo card 12) of the CNC controller becomes too long. Conventionally, a CNC controller and a servo amplifier for individual axis are connected by means of an exclusive cable, so that the number of cables required is equal to the number of servo motors (the number of axes). When a cable is provided for each servo amplifier as mentioned above, since there is a large interval between the CNC controller and the servo amplifier, thick cables will occupy a space, and a large-sized heavy-electrical panel of the machine will be needed, with the result that the overall dimension of the control unit become larger and accordingly the cost becomes higher.

Figure 2:
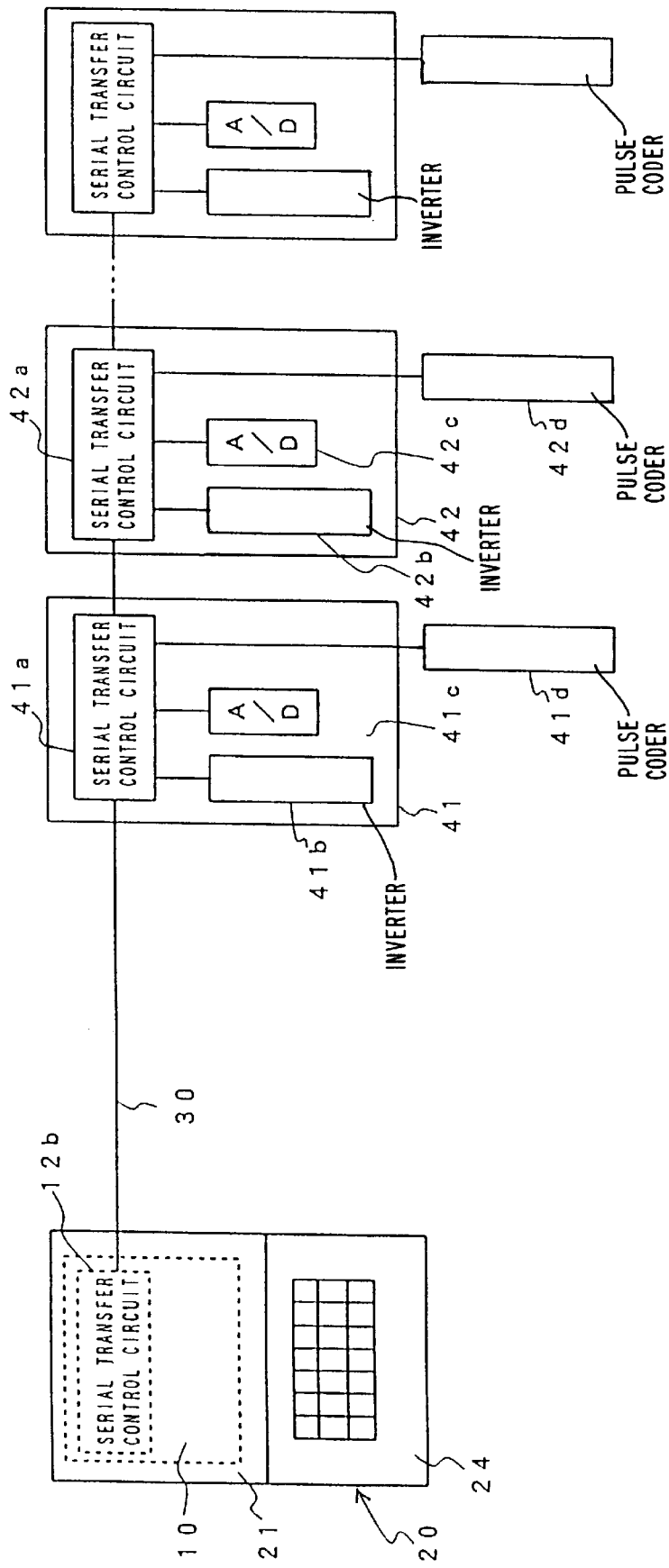
FIG. 2 is a diagram for explaining a method of connecting a CNC controller with each servo amplifier according to the embodiment of the present invention.

In order to avoid such a disadvantage, the present invention comprises a serial servo bus 30 for making a connection between the CNC controller and each servo amplifier by means of one optical fiber cable with a daisy chain formation, as shown in FIG. 2. More specifically, a serial transfer control circuit 12b for controlling the serial servo bus 30 is provided in the servo card 12 of the CNC controller, and likewise, serial transfer control circuits (41a, 42a . . . ) are provided in servo amplifiers (41, 42 . . . ), respectively. Further, the optical fiber cable connects the serial transfer control circuit 12b with the serial transfer control circuit 41a of the servo amplifier 41, the serial transfer control circuit 41a with the serial transfer control circuit 42a of the next servo amplifier 42 and so on. The servo amplifiers (41, 42 . . . ) include inverter circuits (41b, 42b . . . ) which are connected to the serial transfer control circuits (41a, 42a . . . ) and control a current to be supplied to servo motors, A/D converters (41c, 42c . . . ) which detect the currents of servo motors and converting them into digital data, and circuits which receive signals from the position/speed detectors (pulse coder)(41d, 42d . . . ) of the servo motor respectively. Then, data can be transferred at a high transfer speed of about 50 Mbps, which assures substantially equal performance available with the conventional construction in which the CNC controller and each servo amplifier are connected to each other by a cable.

The serial servo bus 30 is capable of transferring all signals required for controlling eight servo motors between the CNC controller and each of servo amplifiers (41, 42 . . . ), within the shortest operational cycle 125μ by a digital signal processor (DSP) mounted on the servo card 12 which executes servo processing. The serial transfer control circuit 12b of the CNC controller converts address information, data, control signals and the like into a serial signal for transmission. The serial transfer control circuits (41a, 42a . . . ) of servo amplifiers (41, 42 . . . ) individually read data assigned to each servo amplifier, and also transfer necessary data to the serial servo bus 30. Thus, the same control as that of an ordinary parallel bus is possible, although the serial servo bus 30 is a serial line in view of hardware.

To give an example of data transfer from respective servo amplifiers (41, 42 . . . ) to the CNC controller, 16-bit servo motor current data and 64-bit output data from pulse coders (41d, 42d . . . ) to be transferred are first divided into 44-bit transmission data, added thereto 16-bit error correcting code, and then transferred. Then, these output data are passed through the serial transfer control circuit 12b (41a, 42a . . . ) so that data of which errors are corrected are obtained. Accordingly, data transfer at a high speed and with high reliability is realized.

Figure 3:
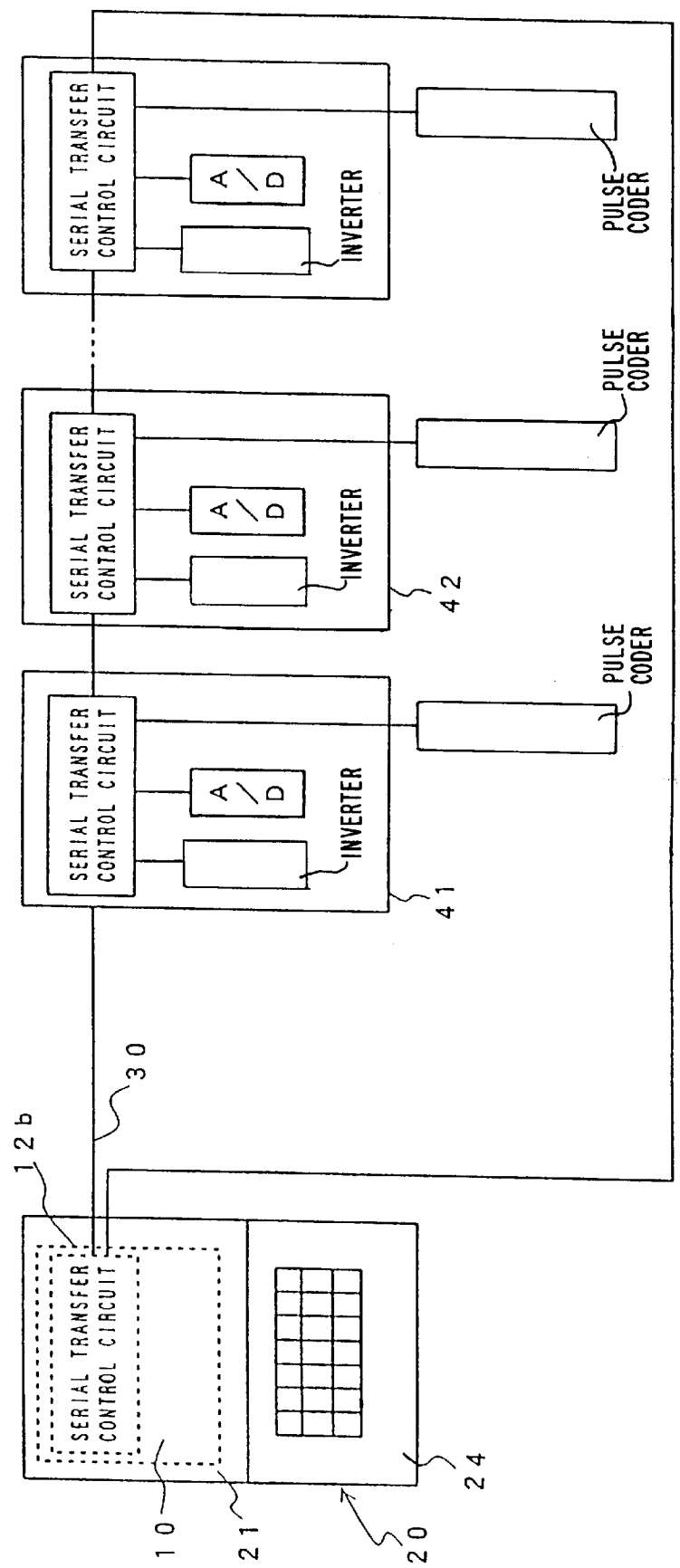
FIG. 3 is a diagram for explaining another method of connecting a CNC controller with each servo amplifier according to one embodiment of the present invention.

In addition, an optical fiber cable connecting the CNC controller and respective servo amplifiers may be in a loop form, as shown in FIG. 3.

Figure 4:
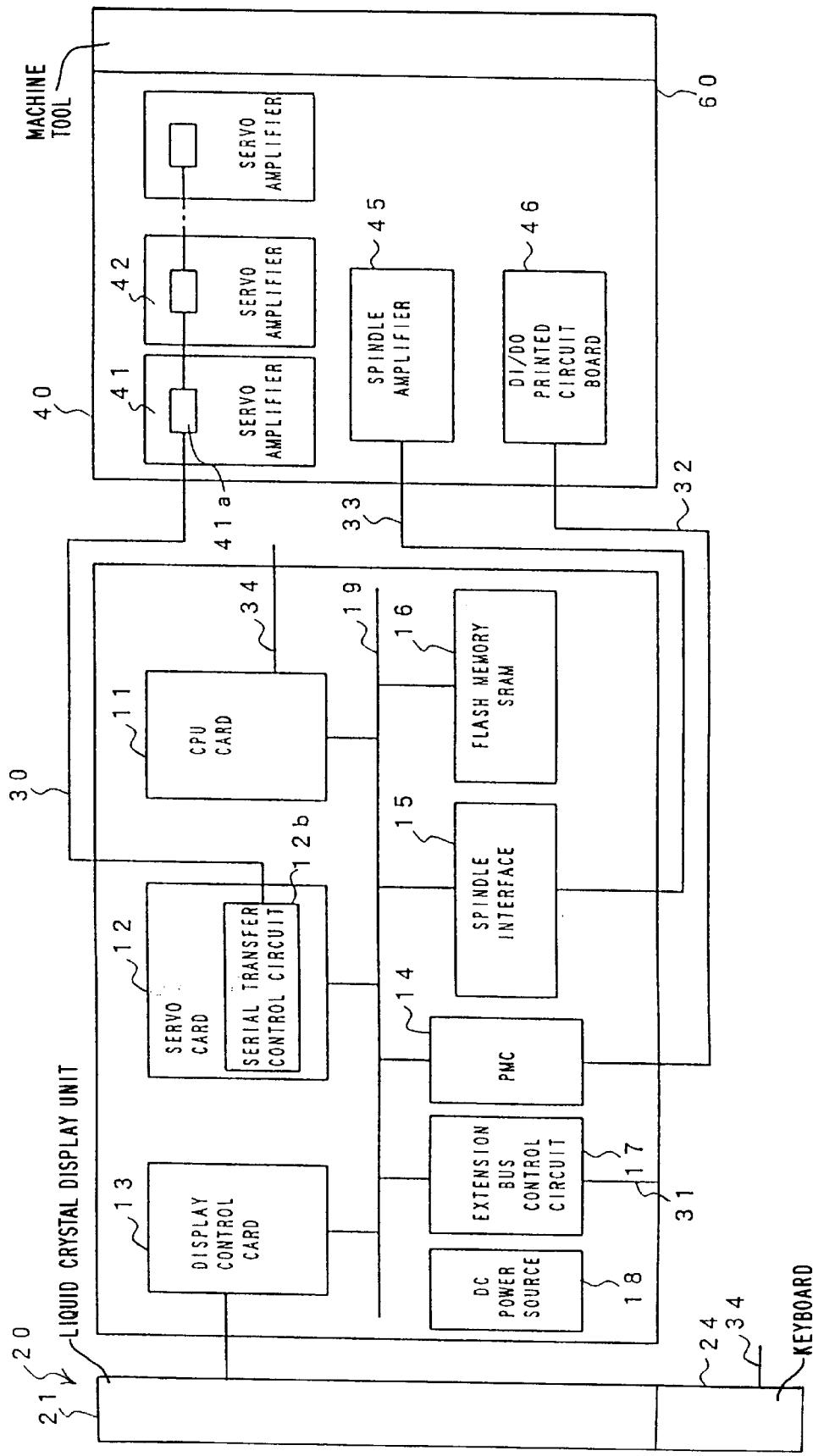
FIG. 4 is a block diagram of a machine tool according to one embodiment of the present invention.

FIG. 4 is a block diagram of a machine tool including a CNC device having a CNC controller and a display unit according to the present invention. As described in FIG. 1, the CNC controller comprises the CPU card 11, servo card 12, display control card 13, PMC 14, spindle interface 15, memory unit 16, extension bus control circuit 17 and power supply circuit 18, which are mounted on the CNC controller-printed circuit board 10 and are connected by means of the bus 19. The display control card 13 is connected to the liquid crystal display unit 21. On the other hand, a controller 40 on the side of machine tool comprises the servo amplifiers (41, 42 . . . ), a spindle amplifier 45 and a DI/DO printed circuit board 46, and further includes a heavy-electrical panel (not shown) on the machine tool side.

The CNC controller and the keyboard 24 of the machine operation panel 20 are connected to each other by a cable 34; therefore, the keyboard 24 and the CPU card 11 are connected to each other by the cable 34. The serial transfer control circuit 12b of the servo card 12 of the CNC controller and the serial transfer control circuit 41a of the servo amplifier 41 of the machine tool controller 40 are connected by an optical fiber cable 30, which constitutes the foregoing serial servo bus. The respective servo amplifiers (41, 42 . . . ) are connected by the optical fiber cable 30, which constitutes the foregoing serial servo bus. By making such a connection as described above, the CNC controller and the respective servo amplifiers are connected to one another. Also, the spindle amplifier 45 of the machine tool controller 40 is connected with the spindle interface 15 of the CNC controller by a cable 33. The DI/DO printed circuit board 46 of the machine tool controller 40 is connected with the PMC 14 of the CNC controller by a cable 32 so that operation signals of various sensors and actuators of the machine side can be transmitted and received.

As seen from the above description, three cables are sufficient to make a connection between the CNC controller disposed on the machine operation panel 20 and the machine tool controller 40 disposed on the heavy-electrical panel of the machine. This serves to make a space occupied by cables small, thereby reducing the size of a numeral control device as well as a machine tool itself. Moreover, the reduction in the number of cables for connection contributes to the cost reduction.

The processor 11a of the CPU card 11 sequentially reads NC machining programs stored in the SRAM of the memory circuit 16 and executes various processings according to the various commands of the NC machining programs. For instance, if the read command is an ON/OFF command to various actuators of the machine, the processor 11a sends an ON/OFF signal to various actuators of a machine tool 60 through the PMC 14, the cable 32, and the DI/DO printed circuit board 46 of the machine controller 40, in the named order. If the read command is a spindle drive command, the processor 11 outputs the drive command of commanded speed to the spindle amplifier 45 through the spindle interface 15 and the cable 33 to drive the spindle motor. If the read command is a movement command for tools etc., the processor 11a of the CPU card 11 computes distribution of the movement command to individual axis, and sends the command to the servo card 12. The processor 12a of the servo card 12 executes position, speed and current feedback controls according to a movement command received for individual axis, and to position, speed and current feedback signals of the corresponding servo motor, which are sent through the serial servo bus 30. And then, the processor 12a outputs the drive command to each of servo amplifiers 41, 42 . . . through the serial transfer control circuit 12b and the serial servo bus 30 to drive each servo motor. The operation of the CNC device of the present invention is the same as that of conventional one, except that a drive command is outputted to a servo amplifier through the foregoing serial servo bus.

Next, a structure of a CNC device of the present invention will be described below.

Figure 5:
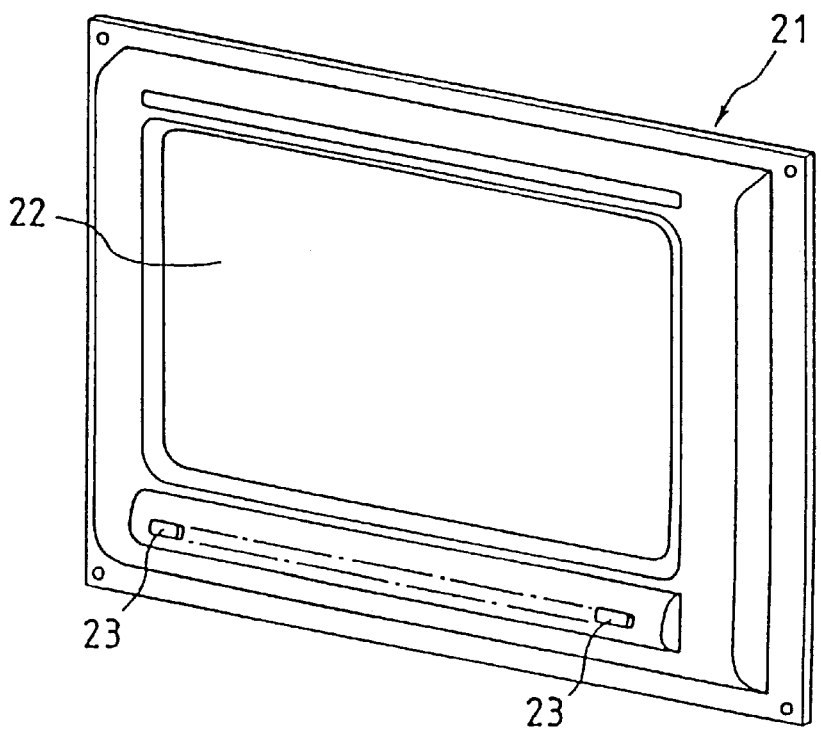
FIG. 5 is a front view of one embodiment of the present invention.

FIG. 5 is a front view of the CNC device according to the present invention. When viewing the CNC device from its front, only a liquid crystal display unit 21 is visible. The liquid crystal display unit 21 is provided with a liquid crystal display screen 22 at the center thereof, and a plurality of software keys 23 below the display screen 22. The function of the software key 23 changes depending upon the liquid crystal display screen.

Figure 6:
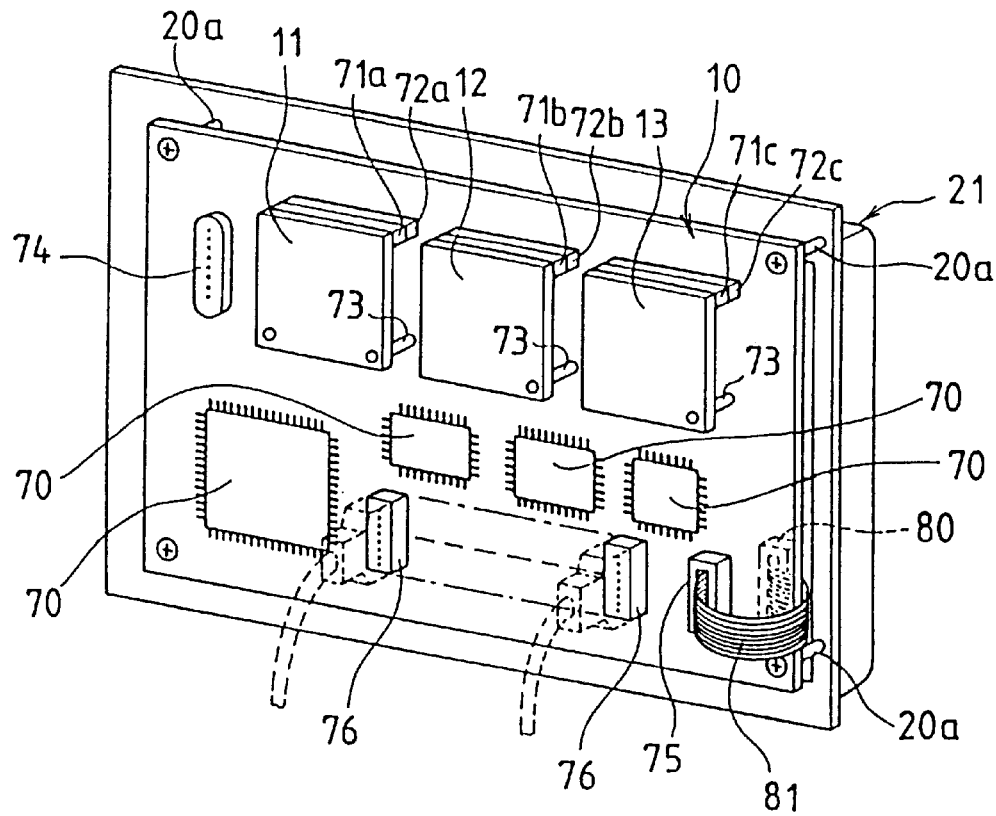
FIG. 6 is a rear view of the embodiment of the present invention.

FIG. 6 is a rear view of the CNC device according to the present invention. The CNC controller-printed circuit board 10 is mounted on the reverse side of the liquid crystal display 21 by screws at a predetermined intervals therebetween through spacing pipes 20a disposed on the reverse side of the liquid crystal display 21. As described before, the CPU card 11, the servo card 12 and the display control card 13 are replaceably mounted on the CNC controller-printed circuit board 10, and a plurality of LSIs 70 are also mounted thereon. These LSIs 70 constitute the power source 18, PMC 14, spindle interface 15, memory circuit 16, extension bus control circuit 17, etc.

The CPU card 11, the servo card 12 and the display control card 13 are electrically connected by connectors 71a, 71b and 71c provided at their respective one ends and connectors 72a, 72b and 72c provided at the CNC controller-printed circuit board 10, respectively. Further, the other ends of these cards are individually fixed to the CNC controller-printed circuit board 10 by screws through spacing pipes 73 so that these cards can be replaceably mounted on the CNC controller-printed circuit board 10.

Moreover, the CNC controller-printed circuit board 10 is provided with various connectors 74, 75 and 76. The connector 74 is used for the extension bus 31 for connecting an optional printed circuit board. The connector 75 is also connected to the liquid crystal display unit 21. Further, the connectors 76 are used for connecting the cable 33 to be connected to the serial servo bus 30 and the spindle amplifier 45, the cable 32 to be connected to the DI/DO printed circuit board 45 of the machine side controller 40, the cable 34 to be connected to the keyboard 24 and other cables. The display control card 13 of the CNC controller and the liquid crystal display unit 21 are electrically connected to each other by means of a cable 81 connected to the connector 75 and a connector 80 disposed on the liquid crystal display unit 21.

The above is a basic construction required for performing fundamental functions of the CNC device. Next, a construction which permits the incorporation of a printed circuit board for performing optional function will be described below.

Such optional printed circuit boards are used in a various instances such as: a loader control board for executing workpiece handling for machining; a RISC board for executing acceleration/deceleration control by previously reading a plurality of small blocks of NC data among continuous small blocks such as mold machining data; a communication board for executing data transfer with external computers through an Ethernet, RS-422, RS-232C, etc.; and a customizer board for executing softwares, which have been developed by machine tool maker for individualization of their machine tools, independently of the processor of the CNC controller. The present embodiment is constructed so as to be connectable with these optional printed circuit boards.

Figure 7:
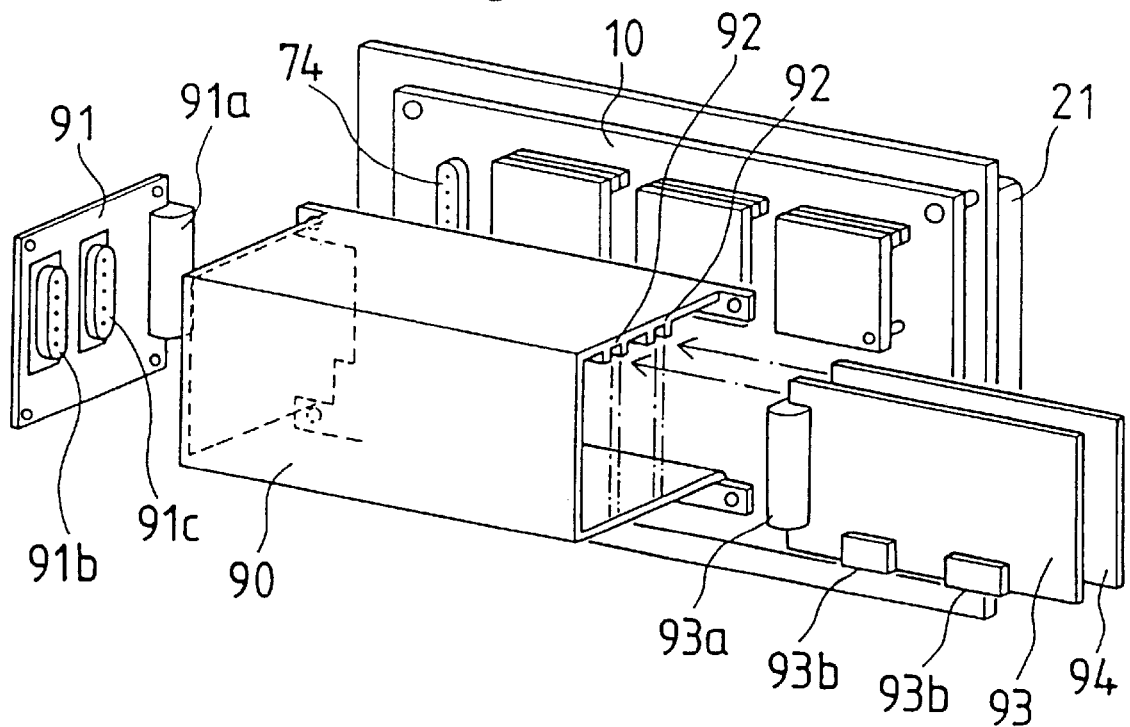
FIG. 7 is a view illustrating a structure designed for incorporating optional printed circuit boards according to the embodiment of the present invention.

FIG. 7 is a diagram for explaining a structure designed for allowing the addition of the optional printed circuit boards to the CNC controller-printed circuit board 10. A reference numeral 90 denotes an optional extension slot for adding optional printed circuit boards 93 and 94. This extension slot 90 has a U-shaped cross section, and is provided with a side plate 91 on the side opposing to the side where these optional printed circuit boards 93 and 94 are inserted. The side plate 91 is provided with connectors 91a, 91b and 91c at its one side. The connectors 91b and 91c can be coupled with connectors 93a and 94a (not shown) provided on the option printed circuit boards 93 and 94, respectively, while the connector 91a not only is electrically connected with these connectors 91b and 91c and but also is coupled to the connector 74 which is connected with the extension bus 31 installed in the CNC controller-printed circuit board 10.

In FIG. 7, the side plate 91 is shown separate from the extension slot 90. When assembling, however, the side plate 91 is fixed to the extension slot 90, the connector 91a is coupled to the connector 74 of the CNC controller-printed circuit board 10, and the open bottom side of the extension slot 90 is fixed to the CNC controller-printed circuit board 10 by screws. Also, optional printed circuit boards 93 and 94 are individually provided with one or more connectors 93b and 94b (not shown) for connection with an external machine through a cable at one side of respective boards 93 and 94 (lower side in FIG. 7), in addition to connectors 93a and 94a coupled to connectors 91b and 91c provided on the side plate 91. Correspondingly, one side face (lower end in FIG. 7) of the extension slot 90 is formed with openings (not shown) for inserting connectors of cable therethrough to face one or more of the connectors 93b, 94b of the optional printed circuit boards 93 and 94 which mounted to the extended slot 90.

Optional printed circuit boards 93 and 94 are inserted into guide grooves 92 and 92, and then, the connectors 93a and 94a of the optional printed circuit boards 93 and 94 are coupled to the connectors 91b and 91c of the extension slot, whereby these optional printed circuit boards 93 and 94 are bus-connected with the CNC controller-printed circuit board 10 via connectors 93a, 94a, 91b, 91c, 91a and 74. The connectors of cable are coupled to the connectors 93b and 94b of the printed circuit boards 93 and 94 through the openings formed in the side plate of the extension slot 90, whereby the optional printed circuit boards 93 and 94 are electrically connected with the external machine.

Figure 8:
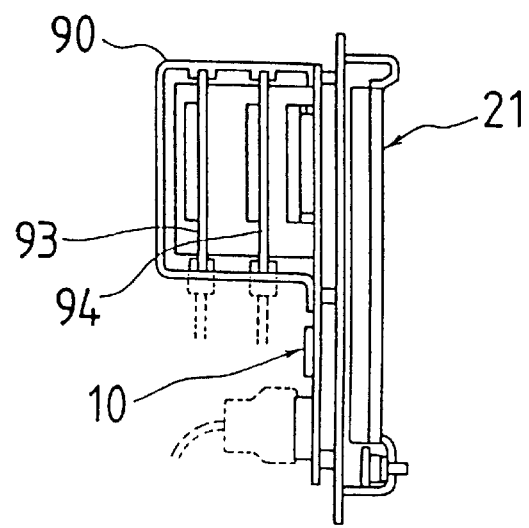
FIG. 8 is a side view of a CNC controller showing an optional extension slot attached to a printed circuit board.

FIG. 8 is a side view of the CNC controller and the display unit in which the optional extension slot 90 is mounted on the CNC controller-printed circuit board 10. In this embodiment, the optional extension slot 90 is mounted on the CNC controller-printed circuit board 10 in a manner such as it straddles both the CPU card 11 on the CNC controller-printed circuit board 10 and the servo card 12 mounted thereon, and also, optional printed circuit boards 93 and 94 are arranged in parallel with these cards 11 and 12 keeping a space therebetween.

In order to increase the number of optional functions, the number of optional printed circuit boards may be increased in the above-mentioned manner using an optional extension slot which permits further addition of optional printed circuit boards. Since an exclusive multitask bus is used as an extension bus in this embodiment, it is possible to add desired number of optional functions for the CNC device.

In the present embodiment, as seen from the construction described above and FIGS. 5, 6, 7 and 8, the CNC device is substantially within the display screen area of the liquid crystal display unit when viewed from the display screen thereof. Thus, there can be made available a CNC device which is considerably thin in depth and small in size.

In the present embodiment, moreover, since the CPU card 11 and the servo card 12 are replaceably mounted on the CNC controller-printed circuit board 10, the CPU 11 can be replaced with a CPU card which serves to enhance the function of the CNC device, or with a CPU card version-upped functions of the same level. Also, if the number of servo motors is varied, the servo card 12 is replaced with another servo card so as to cope with a change in the number of axes of the machine such as machine tool, etc.

In addition, since the display control card 13 is also replaceably mounted on the CNC controller-printed circuit board 10, it is possible to incorporate a personal computer, as an option of the CNC device, by mounting a very small scale and card-sized computer board on the market on the printed circuit board 10.

Figure 9:
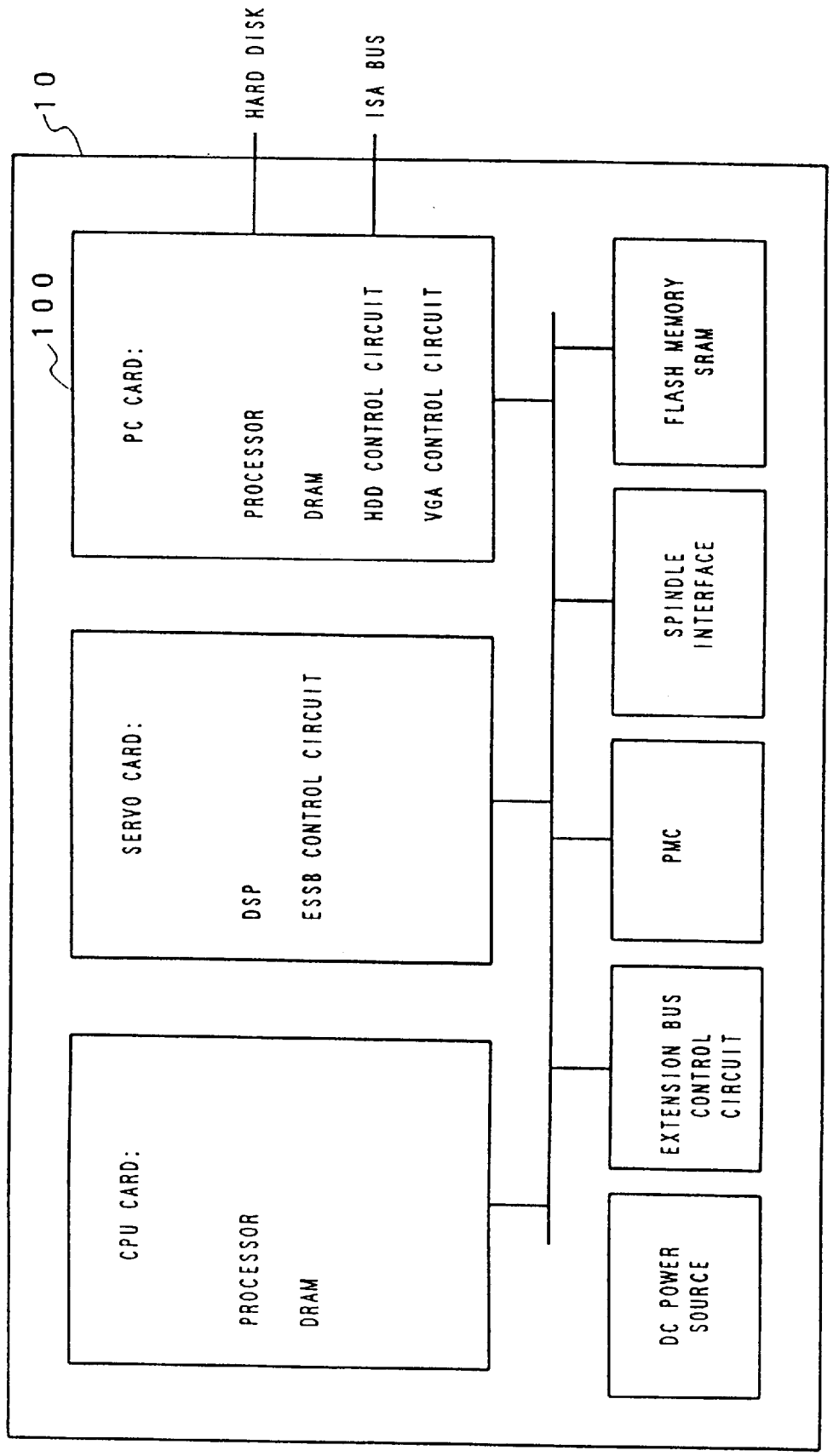
FIG. 9 is a function block diagram of the numerical control unit and the display unit, to which a computer circuit board is attached instead of a display control card, according to one embodiment of the present invention.

FIG. 9 is a functional block diagram of a case where a computer board 100 is mounted in place of the display control card 13. In this case, a processor, a DRAM, a hard disk control circuit, a graphic control circuit, etc., are mounted on the computer board, so that the computer board 100 is connectable with not only a hard disk but also with other equipment through an extension bus ISA for personal computer.

The above embodiment has employed a liquid crystal display unit as a display. In this embodiment, however, a small-sized and thin type plasma display or a thin type EL (electronic luminescence) display may be used in place of the liquid crystal display unit. In this case, the display control card 13 functions as a display control card for controlling these plasma display and EL display, and this card may be mounted on the CNC controller-printed circuit board 10.

As described above, in the present invention, the CNC controller is constructed in a manner such that a printed circuit board is attached to the back of a thin type display unit, and a CPU card, a servo card and a display control card are mounted on the circuit board. Thus, there can be provided a CNC device whose size including the depth is reduced to an extent that its size is no longer a matter of any serious consideration. Further, the display unit and the CNC controller are connected to each other by means of a shorter cable, so that there is no need of providing synchronizing circuits for display, etc. Therefore, this contributes to the cost reduction. Furthermore, downsizing of the numerical control device also leads to the downsizing of the machine tool using the CNC device, thereby contributing to further cost reduction. In addition, the CNC controller and the display unit are downsized and thinned integrally with each other, so that the machine operation panel on which the CNC controller and the display unit are mounted can be arranged on the optimum location with little restriction.

Change of a function of the CNC device and change of version of the CNC device can readily be carried out by replacing the CPU card. Further, even when the number of servo motors changes, it is possible to readily cope with the change by replacing the servo card.

Also, since the servo card and servo motors are connected to each other by means of a serial servo bus of daisy chain formation, the number of interface connectors on the CNC device side may be only one regardless of the number of servo motors. Thus, the servo card can be downsized and the number of cables can be reduced; therefore, a machine can be downsized, thereby contributing to the cost reduction of the machine.

Since a multitask bus is used as an extension bus, various optional functions required for a CNC device can easily be added. By adding optional functions on demand in the same manner as the conventional CNC device, general-purpose applicability becomes available so that the CNC device can be made applicable to various machine tools ranging from single-function type to multi-function type and from standard-performance type to high-performance type. Thus, by supplying the CNC controller, which is a central system of the CNC device, on mass-production basis, the cost of CNC device can be reduced.

The CNC controller-printed circuit board, CPU card, servo card, display control card, option printed circuit boards, various functions, etc., are modularized and made replaceable, so that when any one of these components has become wrong, such wrong printed circuit boards or cards only need to be replaced, thereby making easier the measures against the trouble.

We claim:
1. A numerical control device comprising:
   a thin type display unit in which display input is a digital signal;
   a printed circuit board mounted to the reverse side of said thin type display unit so that it is opposite to said display unit, said printed circuit board comprising:
   a connector coupled to the thin type display unit,
   a bus,
   at least one card-like circuit coupled to the bus and comprising a processor and integrated circuits executing numerical control processing, said at least one card-like circuit replaceably connected to said printed circuit board through the connector, and
   a card-like circuit coupled to the bus and generating a control signal transmitted to said display unit through the connector, wherein the printed circuit board includes a surface area substantially equal to part of a surface area of said thin type display unit, and wherein the at least one card-like circuit and the card-like circuit are high-integration LSI and high-density surface mounting components.

2. A numerical control device comprising:
a liquid crystal display unit;
a CNC controller comprising a printed circuit board mounted to the reverse side of the liquid crystal display unit parallel to a plane including the reverse side of the liquid crystal display unit, said printed circuit board comprising:
a bus,
a numerical processing circuit executing numeral control processing and coupled to the bus,
a servo processing circuit coupled to the bus and executing servo processing according to a movement command to a servo motor of an individual axis obtained through said numerical processing circuit, said servo processing circuit coupled to controller comprising servo amplifiers coupled in series with each other and with the servo processing circuit, and
a display control circuit coupled to the bus and to the liquid crystal display unit and generating a signal display controlling wherein the surface area of the printed circuit board is substantially equal to part of a surface area of the liquid crystal display unit; and
a cable electronically connecting said printed circuit board and said liquid crystal display unit to each other.

3. The numerical control device according to claim 2, wherein said numerical processing circuit includes a circuit computing a movement command to an individual axis according to machining programs, executing transmission/reception of an ON/OFF signal with a machine, and controlling a communication with an operator through a keyboard and said liquid crystal display unit.

4. The numerical control device according to claim 2, wherein said printed circuit board includes a surface area smaller than that of said liquid crystal display unit.

5. The numerical control device according to claim 2, wherein one of a plasma display and an electron luminescence display is used in place of said liquid crystal display unit.

6. The numerical control device according to claim 2, wherein at least one of said numerical processing circuit, said servo processing circuit, and said circuit generating a signal for display control, which are mounted on said printed circuit board constituting a CNC controller, is mounted on a printed circuit board smaller than said printed circuit board to be modularized, and said modularized circuit is made replaceable.

7. The numerical control device according to claim 2, wherein said circuit generating a signal for display controlling is mounted on a printed circuit board smaller than said printed circuit board to be modularized and made replaceable, so that this modularized circuit can be replaced with a board which provides a function of a personal computer so as to realize a function of a personal computer.

8. A numerical control device comprising:
a CNC controller comprising:
a printed circuit board comprising:
a bus,
a numerical processing circuit executing numerical control processing and coupled to the bus,
a servo processing circuit, coupled to the bus and executing servo processing according to a movement command to a servo motor of an individual axis computed by said numerical processing circuit, and
a circuit coupled to the bus and executing a personal computer function, so that the personal computer function is realized by using said printed circuit board, said circuit comprising a processor, a DRAM, an HDD control circuit, and a VGA control circuit.

9. The numerical control device according to claim 2, wherein said printed circuit board comprises:
a multitask bus extending CNC options, and
an extension slot for an optional printed circuit board equipped with an optional function circuit at an upper portion of said printed circuit board, wherein said extension slot and said multitask bus are connected to each other, and said optional printed circuit board and the bus are connected to each other.

10. The numerical control device according to claim 2, wherein said printed circuit board constituting said CNC controller is connected with a plurality of servo amplifiers by a serial servo bus comprising an optical fiber cable in a daisy-chain form.

11. The numerical control device according to claim 2, wherein a circuit executing sequence control of a machine to be controlled is mounted on said printed circuit board constituting a CNC controller.

12. The numerical control device according to claim 2, wherein a circuit outputting a rotation command to a spindle motor of a machine tool to a spindle amplifier according to a machining program is mounted on said printed circuit board constituting a CNC controller.

13. The numerical control device according to claim 2, wherein a power supply circuit is mounted on said printed circuit board constituting a CNC controller.

14. The numerical control device according to claim 2, wherein a memory circuit storing machining programs is mounted on said printed circuit board constituting a CNC controller.

15. The numerical control device according to claim 2, wherein a circuit executing data transfer with external equipment is mounted on said printed circuit board constituting a CNC controller.

16. The numerical control device according to claim 8, wherein said printed circuit board comprises:
a multitask bus extending CNC options, and
an extension slot for an optional printed circuit board equipped with an optional function circuit at an upper portion of said printed circuit board, wherein said extension slot and said multitask bus are connected to each other, and said optional printed circuit board and the bus are connected to each other.

17. The numerical control device according to claim 8, wherein said printed circuit board constituting said CNC controller is connected with a plurality of servo amplifiers by a serial servo bus comprising an optical fiber cable in a daisy-chain form.

18. The numerical control device according to claim 8, wherein a circuit executing sequence control of a machine to be controlled is mounted on said printed circuit board constituting a CNC controller.

19. The numerical control device according to claim 8, wherein a circuit outputting a rotation command to a spindle motor of a machine tool to a spindle amplifier according to a machining program is mounted on said printed circuit board constituting a CNC controller.

20. The numerical control device according to claim 8, wherein a memory circuit storing machining programs is mounted on said printed circuit board constituting a CNC controller.

21. The numerical control device according to claim 8, wherein a circuit executing data transfer with external equipment is mounted on said printed circuit board constituting a CNC controller.

* * * * *